United States Patent [19]
Bennett

[11] Patent Number: 5,761,441
[45] Date of Patent: Jun. 2, 1998

[54] DATA PROCESSING SYSTEM FOR ANALYZING AND ADMINISTERING A STOCK INVESTMENT LIMITED-RECOURSE BORROWING CONTRACT

[76] Inventor: Jack F. Bennett, 141 Taconic Rd., Greenwich, Conn. 06831

[21] Appl. No.: 520,381

[22] Filed: Aug. 29, 1995

[51] Int. Cl.[6] ................................................. G06F 17/60
[52] U.S. Cl. ................................................. 395/235
[58] Field of Search .................................. 395/235, 236, 395/237, 238, 239

*Primary Examiner*—Gail O. Hayes
*Assistant Examiner*—Junghoon Kenneth Oh
*Attorney, Agent, or Firm*—Brumbaugh, Graves, Donohue & Raymond

[57] ABSTRACT

A data processing system analyzes a stock investment limited recourse borrowing contract. The system receives and processes as input data on the date of analysis (1) contract data including the identity and amount of the collateral stock, the amount of the initial loan and the minimum and maximum interest rate percentages payable by the investor under the contract; (2) actual data relating to the stock prior to the analysis date including its market prices per share at selected regular intervals and the dividends per share paid in a selected number of quarters; and (3) estimated data relating to the stock from the analysis date to the end of the contract term including its estimated market price per share at intervals and the estimated dividends per share to be paid. The programmed processor processes the input data and produces as output data (1) calculated average growth rates of market prices per share and dividends per share; (2) projected amounts of interest to be paid by the investor in each period of the contract and of the amounts and timing of principal repayments to be made by the investor to the lender; and (3) projected average internal rates of return to both the investor and the lender over the life of the contract on their investments under the contract by discounting over the contract term all of the inflows and outflows of value to the investor and to the lender based on actual and projected market prices per share and dividends per share.

10 Claims, 18 Drawing Sheets

FILE #: TOP024
VALUE DATE: 2/12/97
CASE: b

"T-O-P"
PAGE CHOICE MENU

| PAGE | | GO TO |
|---|---|---|
| 1 | MENU | |
| 2 | SUMMARY OUTPUT | K1 |
| 3 | CONTRACT TERMS AND BASIC ASSUMPTIONS | U1 |
| 4 | DIVIDEND, SHARE PRICE, AND INTEREST RATE MARKET DATA AND PROJECTIONS | AF1 |
| 5 | ORIGINAL PROJECTIONS OF "T-O-P" LENDER'S CASH FLOWS AND LOANS OUTSTANDING | AT1 |
| 6 | REVISED PROJECTIONS OF "T-O-P" LENDER'S CASH FLOWS AND LOANS OUTSTANDING | BE1 |
| 7 | ORIGINAL PROJECTIONS OF VALUE FLOWS FOR "T-O-P" INVESTOR | BP1 |
| 8 | REVISED PROJECTIONS OF VALUE FLOWS FOR "T-O-P" INVESTOR | CC1 |
| 9 | PROJECTIONS OF "T-O-P" LENDER'S FUTURE CASH FLOWS RECEIVED AND FOREGONE IN CASE OF EARLY TERMINATION | CO1 |
| 10 | VALUE FLOW PROJECTIONS FOR ALTERNATE ORDINARY SHARE INVESTMENT | DB1 |

(NO DATA ENTRY IS REQUIRED ON THIS PAGE.
TO VIEW A SUMMARY OF THE EXISTING CASE GO TO PAGE 2.
TO REVISE THE EXISTING CASE OR PREPARE A NEW CASE GO
  TO PAGE 3 AND/OR PAGE 4.)

FIG. 7

| | | |
|---|---|---|
| TO BE PAID BY: | DIVIDEND: | 6,650 |
| | ADDED BORROWING: | 0 |
| | TOTAL | 6,650 |
| EXPECTED USE OF NEXT DIVIDEND: | | |
| | TO PAY INTEREST: | 6,650 |
| | TO REPAY LOANS: | 0 |
| | TO PAY TRUSTEE: | 350 |
| | | 7,000 |

| | HELD | SOLD |
|---|---|---|
| PROJECTED AFTER-TAX % RETURN OVER CONTRACT PERIOD IF STOCK: | 13.20 | 10.51 |
| FOR ALTERNATIVE ORDINARY SHARE INVESTMENT OF: $316,801 | | |

PROJECTED FUTURE YIELD FOREGONE BY LENDER IF TERMINATION ANNOUNCED ON VALUE DATE BY:
INVESTOR 8.10 %
LENDER 10.60 %

(DO NOT ENTER DATA ON THIS PAGE. WHEN A NEW CASE IF PREPARED THIS PAGE WILL BE REVISED AUTOMATICALLY.)

FIG. 8A

FILE #: TOP024
VALUE DATE: 2/12/97
CASE: B

"T-O-P"
SUMMARY OUTPUT

INVESTOR: J.F.BENNETT

VALUE OF COLLATERAL:
  INITIAL: $660,000
  AS OF VALUE DATE: $705,000
INVESTMENT OF OWN AFTER-TAX FUNDS: $616,800
AFTER-TAX INVESTMENT RETURN IF SHARES:
                                  HELD    SOLD
  PROJECTED AT CONTRACT SIGNING:  15.24%  10.49%
  PROJECTED AT VALUE DATE:  15.81%  10.99%

LENDER: ABC PENSION FUND
AMOUNT OF LOAN:
  INITIAL: $300,000
  AS OF VALUE DATE: $300,321
INTEREST YIELD:
  ORIGINAL EXPECTATION: 8.02%
  LATEST PROJECTION: 10.44%

TRUSTEE: XYZ TRUST COMPANY
QUARTERLY FEE: $350

CONTRACT DATES: 1/4/96 TO 3/6/01

COLLATERAL: 10,000 SHARES OF STEADY CORPORATION

LEAST SQUARES ANNUAL AVERAGE GROWTH RATES OF:
FOR 3 YRS TO DIVIDEND DATE OR MONTH-END BEFORE CONTRACT START:
FROM BEFORE CONTRACT START TO BEFORE CONTRACT END:

|  | DIVIDEND | SHARE PRICE |
|---|---|---|
|  | 2.64 % | 2.57 |
| PROJECTED AT CONTRACT START: | 1.29 % | 2.30 |
| PROJECTED AT VALUE DATE: | 3.91 % | 2.41 |

SHARE MARKET VALUES:

| | DATE | $ PER SHARE | $ TOTAL |
|---|---|---|---|
| AT CONTRACT START: | 1/0/00 | 66.000 | 660,000 |
| AT VALUE DATE IF LATER: | 2/12/97 | 70.500 | 705,000 |
| VALUE AT CONTRACT END: | 1/0/00 | | |
|   PROJECTED AT CONTRACT START: | | 100.000 | 1,000,000 |
|   PROJECTED AT VALUE DATE: | | 102.000 | 1,020,000 |

DIVIDENDS:

| | DATE | $ PER SHARE | $ TOTAL |
|---|---|---|---|
| LAST PRIOR TO CONTRACT START | 12/10/95 | 0.525 | 5,250 |
| MOST RECENT PRIOR TO VALUE DATE: | 12/10/96 | 0.650 | 6,500 |
| NEXT AS PROJECTED ON VALUE DATE: | 3/10/97 | 0.700 | 7,000 |
| LAST BEFORE END OF CONTRACT: | 12/11/00 | | |
|   PROJECTED AT CONTRACT START: | | 0.715 | |
|   PROJECTED AT VALUE DATE: | | 1.150 | 11,500 |

NEXT INTEREST PAYMENT EXPECTED: 3/10/97 $

FIG. 8B

FILE #: TOP024
VALUE 1/0/00
CASE: B         CONTRACT TERMS AND BASIC ASSUMPTIONS

| | |
|---|---|
| BORROWER: | J. F. BENNETT |
| LENDER: | ABC PENSION FUND |
| TRUSTEE: | XYZ TRUST COMPANY |
| CONTRACT DATES: | 1/4/96 TO 3/6/01 |
| AMOUNT OF INITIAL LOAN: | $300,000 |
| COLLATERAL: | 10,000 SHARES OF STEADY CORPORATION |

INTEREST RATE:
  MINIMUM: 7.25 %
  MAXIMUM: 14 %

QUARTERLY TRUSTEE FEE PAID: $350

EXCESS OVER TREASURY NOTE INTEREST RATE OF ESTIMATED FUTURE ANNUAL INT.
RATE FOREGONE BY LENDER IF CONTRACT TERMINATED BY:

| | INVESTOR % | LENDER % |
|---|---|---|
| | 0.5 | 3 |

INVESTOR'S TAX BASIS FOR COLLATERAL SHARES:

| | NUMBER OF SHARES | PER SHARE $ | TOTAL $ |
|---|---|---|---|
| | 5455 | 41.247 | 225,000 |
| | 4545 | 66.000 | 300,000 |
| | - | | - |
| TOTAL: | 10,000 | | 525,000 |

FORECAST EFFECTIVE TAX RATES APPLICABLE TO:

ON INCOME:

| | | | | INVESTOR % | LENDER % |
|---|---|---|---|---|---|
| FROM: | 1/4/96 | TO: | 3/6/01 | 45 | 0 |
| FROM: | | TO: | | | |
| FROM: | | TO: | | | |

ON CAPITAL GAINS:

| | INVESTOR | LENDER |
|---|---|---|
| AT CONTRACT START: | 32 | 0 |
| AT CONTRACT END: | 32 | 0 |

(MAKE ENTRIES IN BOXES ON THIS PAGE FOR ORIGINAL LISTING OF, OR CHANGES IN. CON CONTRACT TERMS AND/OR FORECAST TAX RATES.)

FIG. 9

DIVIDEND, SHARE PRICE, AND INTEREST RATE MARKET DATA AND PROJECTIONS

FILE #: TOP024
VALUE DATE: 2/12/97
CASE: B

MARKET VALUE PER SHARE: ON CONTRACT BEGINNING DATE: $66.00
ON VALUE DATE: $70.50

YIELD ON VALUE DATE OF TREASURY NOTE MATURING AFTER CONTRACT END: 7.60 %

| DATES | NO. OF COLLATERAL SHARES | MARKET VALUE PER SHARE — EXPECTED AT TIME OF CONTRACT SIGNING $ | MARKET VALUE PER SHARE — ACTUAL + PROJECTED AS OF VALUE DATE $ | CALCULATED FOR TERMINATION ANALYSIS $ | | DATES | NO. OF COLLATERAL SHARES | DIVIDEND PER SHARE — EXPECTED AT CONTR. SIGNING $ | DIVIDEND PER SHARE — ACTUAL + PROJECTED AS OF VALUE DATE $ | CALCULATED FOR TERMINATION ANALYSIS $ |
|---|---|---|---|---|---|---|---|---|---|---|
| 12/31/92 | 10,000 | 50.000 | 50.000 | 50.000 | | 12/10/92 | 10,000 | 0.375 | 0.375 | 0.375 |
| 3/31/93  | 10,000 | 49.000 | 49.000 | 49.000 | | 3/10/93  | 10,000 | 0.400 | 0.400 | 0.400 |
| 6/30/93  | 10,000 | 54.000 | 54.000 | 54.000 | | 6/10/93  | 10,000 | 0.400 | 0.400 | 0.400 |
| 9/30/93  | 10,000 | 54.300 | 54.300 | 54.300 | | 9/10/93  | 10,000 | 0.400 | 0.400 | 0.400 |
| 12/31/93 | 10,000 | 53.000 | 53.000 | 53.000 | | 12/10/93 | 10,000 | 0.425 | 0.425 | 0.425 |
| 3/31/94  | 10,000 | 55.000 | 55.000 | 55.000 | | 3/10/94  | 10,000 | 0.425 | 0.425 | 0.425 |
| 6/30/94  | 10,000 | 59.000 | 59.000 | 59.000 | | 6/10/94  | 10,000 | 0.450 | 0.450 | 0.450 |
| 9/30/94  | 10,000 | 60.000 | 60.000 | 60.000 | | 9/12/94  | 10,000 | 0.450 | 0.450 | 0.450 |
| 12/31/94 | 10,000 | 62.000 | 62.000 | 62.000 | | 12/12/94 | 10,000 | 0.450 | 0.450 | 0.450 |
| 3/31/95  | 10,000 | 64.000 | 64.000 | 64.000 | | 3/10/95  | 10,000 | 0.480 | 0.480 | 0.480 |
| 6/30/95  | 10,000 | 63.500 | 63.500 | 63.500 | | 6/12/95  | 10,000 | 0.500 | 0.500 | 0.500 |
| 9/30/95  | 10,000 | 65.000 | 65.000 | 65.000 | | 9/11/95  | 10,000 | 0.500 | 0.500 | 0.500 |
| 12/31/95 | 10,000 | 66.000 | 66.000 | 66.000 | | 12/10/95 | 10,000 | 0.525 | 0.525 | 0.525 |
| 3/31/96  | 10,000 | 66.500 | 64.000 | 64.000 | | 3/11/96  | 10,000 | 0.570 | 0.525 | 0.525 |
| 6/30/96  | 10,000 | 67.000 | 65.000 | 65.000 | | 6/10/96  | 10,000 | 0.577 | 0.550 | 0.550 |
| 9/30/96  | 10,000 | 68.000 | 68.900 | 68.900 | | 9/10/96  | 10,000 | 0.584 | 0.600 | 0.600 |
| 12/31/96 | 10,000 | 69.000 | 70.500 | 70.500 | | 12/10/96 | 10,000 | 0.591 | 0.650 | 0.650 |
| 3/31/97  | 10,000 | 71.000 | 72.000 | 71.017 | | 3/10/97  | 10,000 | 0.598 | 0.700 | 0.646 |
| 6/30/97  | 10,000 | 73.000 | 74.000 | 72.260 | | 6/10/97  | 10,000 | 0.605 | 0.761 | 0.670 |
| 9/30/97  | 10,000 | 75.000 | 76.000 | 73.525 | | 9/10/97  | 10,000 | 0.612 | 0.782 | 0.694 |
| 12/31/97 | 10,000 | 77.000 | 78.000 | 74.811 | | 12/10/97 | 10,000 | 0.620 | 0.803 | 0.719 |
| 3/31/98  | 10,000 | 79.000 | 80.000 | 76.121 | | 3/10/98  | 10,000 | 0.627 | 0.826 | 0.745 |
| 6/30/98  | 10,000 | 81.000 | 82.000 | 77.453 | | 6/10/98  | 10,000 | 0.635 | 0.860 | 0.772 |
| 9/30/98  | 10,000 | 83.000 | 84.000 | 78.808 | | 9/10/98  | 10,000 | 0.642 | 0.872 | 0.800 |
| 12/31/98 | 10,000 | 85.000 | 86.000 | 80.187 | | 12/10/98 | 10,000 | 0.650 | 0.896 | 0.829 |
| 3/31/99  | 10,000 | 87.000 | 88.000 | 81.591 | | 3/10/99  | 10,000 | 0.658 | 0.921 | 0.859 |

FIG. 10A

|  |  |  |  |  |  |
|---|---|---|---|---|---|
| 6/30/99 | 10,000 | 89.000 | 90.000 | 6/10/99 | 10,000 | 0.666 | 0.947 |
| 9/30/99 | 10,000 | 91.000 | 92.000 | 9/10/99 | 10,000 | 0.674 | 0.973 |
| 12/31/99 | 10,000 | 93.000 | 94.000 | 12/10/99 | 10,000 | 0.682 | 1.000 |
| 3/31/00 | 10,000 | 95.000 | 96.000 | 3/10/00 | 10,000 | 0.690 | 1.028 |
| 6/30/00 | 10,000 | 97.000 | 98.000 | 6/10/00 | 10,000 | 0.698 | 1.056 |
| 9/30/00 | 10,000 | 99.000 | 100.000 | 9/11/00 | 10,000 | 0.707 | 1.125 |
| 12/31/00 | 10,000 | 99.500 | 101.500 | 12/11/00 | 10,000 | 0.715 | 1.150 |
| 3/5/01 | 10,000 | 100.000 | 102.000 | | | | |

| | |
|---|---|
| 83.019 | 0.890 |
| 84.472 | 0.923 |
| 85.950 | 0.956 |
| 87.454 | 0.991 |
| 88.985 | 1.026 |
| 90.542 | 1.064 |
| 92.126 | 1.102 |

(TO PREPARE A NEW CASE:
-INSERT A NEW CASE DESIGNATION AND, IF DESIRED, A NEW VALUE DATE AND A NEW FILE NUMBER
   IN THE BOX AT THE UPPER LEFT OF THIS PAGE;
-IN THE LARGE BOXES ON THIS PAGE REPLACE PREVIOUSLY ESTIMATED DATA WITH ANY NEWLY AVAILABLE ACTUAL DATA AND
   REPLACE ANY PREVIOUSLY ESTIMATED DATA FOR FUTURE PERIODS, TO THE EXTENT DESIRABLE, WITH NEW
   ESTIMATES. ACTUAL DATA IS SHOWN IN BOLD PRINT.
DATA OUTSIDE THE BOXES ON THIS AND ALL OTHER PAGES IS AUTOMATICALLY REVISED APPROPRIATELY WHENEVER NEW
   DATA IS ENTERED INSIDE A BOX.)

FIG. 10B

FILE #: TOP024
VALUE DATE: 2/12/97    ORIGINAL PROJECTIONS OF LENDER'S CASH FLOWS
CASE: B    AND LOANS OUTSTANDING (AS OF CONTRACT START)

| DATES | INTEREST RECEIVED BY TRUSTEE TRANSFER OUT OF DIVIDENDS RECEIVED $ (NOTE 1) | BY INVESTOR RETURN OF FUNDS FROM ADDED LOANS $ (NOTE 2) | (INITIAL LOAN), PRINCIPAL RE-PAYMENT AT MATURITY $ | (NEW LOANS TO PAY INTEREST $ (NOTE 2) | LOAN REPAY-MENTS BY TRUSTEE TRANSFER OUT OF DIVIDENDS RECEIVED $ (NOTE 3) | LENDER'S NET CASH FLOW $ | LOAN PRINCIPAL OUT-STANDING AT END OF PERIOD $ |
|---|---|---|---|---|---|---|---|
| 1/4/96 | 0 | 0 | -300,000 | 0 | 0 | -300,000 | 300,000 |
| 3/11/96 | 5,350 | 0 | | 0 | 0 | 5,350 | 300,000 |
| 6/10/96 | 5,418 | 53 | | -53 | 0 | 5,418 | 300,053 |
| 9/10/96 | 5,488 | 45 | | -45 | 0 | 5,488 | 300,098 |
| 12/10/96 | 5,558 | 0 | | 0 | 0 | 5,558 | 300,098 |
| 3/10/97 | 5,629 | 0 | | 0 | 0 | 5,629 | 300,098 |
| 6/10/97 | 5,700 | 0 | | 0 | 0 | 5,700 | 300,098 |
| 9/10/97 | 5,773 | 0 | | 0 | 0 | 5,773 | 300,098 |
| 12/10/97 | 5,846 | 0 | | 0 | 0 | 5,846 | 300,098 |
| 3/10/98 | 5,921 | 0 | | 0 | 0 | 5,921 | 300,098 |
| 6/10/98 | 5,996 | 0 | | 0 | 0 | 5,996 | 300,098 |
| 9/10/98 | 6,072 | 0 | | 0 | 0 | 6,072 | 300,098 |
| 12/10/98 | 6,149 | 0 | | 0 | 0 | 6,149 | 300,098 |
| 3/10/99 | 6,227 | 0 | | 0 | 0 | 6,227 | 300,098 |
| 6/10/99 | 6,306 | 0 | | 0 | 0 | 6,306 | 300,098 |
| 9/10/99 | 6,386 | 0 | | 0 | 0 | 6,386 | 300,098 |
| 12/10/99 | 6,467 | 0 | | 0 | 0 | 6,467 | 300,098 |
| 3/10/00 | 6,549 | 0 | | 0 | 0 | 6,549 | 300,098 |
| 6/10/00 | 6,631 | 0 | | 0 | 0 | 6,631 | 300,098 |
| 9/11/00 | 6,715 | 0 | | 0 | 0 | 6,715 | 300,098 |
| 12/11/00 | 6,800 | 0 | | 0 | 0 | 6,800 | 300,098 |
| 3/6/01 | 0 | 5,109 | 305,208 | -5,109 | 0 | 305,208 | 0 |

NOTE 1 - PAYMENTS IN THIS COLUMN EQUAL DIVIDEND RECEIPTS - LESS THE TRUSTEE FEE - BUT NOT MORE THAN TOTAL INTEREST WHICH WOULD ACCRUE FOR THE PERIOD AT THE MAXIMUM INTEREST RATE NOR LESS THAN ZERO.

NOTE 2 - ADDED LOANS ARE MADE BY THE LENDER AND RETURNED BY THE INVESTOR AS INTEREST - WITHOUT ACTUAL CASH REMITTANCES - TO THE EXTENT THAT MINIMUM REQUIRED INTEREST IN A PERIOD ECEEDS TRANSFER BY THE TRUSTEE OUT OF DIVIDENDS.

NOTE3 - SUCH PAYMENTS, IF ANY, EQUAL THE EXCESS OF DIVIDENDS RECEIVED BY THE TRUSTEE, LESS TRUSTEE FEE, OVER THE AMOUNT PAYABLE IN INTEREST DURING PERIOD.

(DO NOT ENTER DATA ON THIS PAGE. WHEN A NEW CASE IS PREPARED THIS PAGE WILL BE REVISED AUTOMATICALLY)

FIG. 11

FILE #: TOP024
VALUE DATE: 2/12/97
CASE: B

REVISED PROJECTIONS OF LENDER'S CASH FLOWS
AND LOANS OUTSTANDING (AS OF VALUE DATE)

| DATES | INTEREST RECEIVED BY TRUSTEE TRANSFER OF DIVIDENDS RECEIVED $ (Note 1) | INTEREST RECEIVED BY INVESTOR RETURN OF FUNDS FROM ADDED LOANS $ (Note 2) | (INITIAL LOAN), PRINCIPAL RE-PAYMENT AT MATURITY $ | (NEW LOANS TO PAY INTER-EST $ (Note 2) | REPAY-MENTS BY TRUSTEE TRANSFER OUT OF DIVIDENDS RECEIVED $ (Note 3) | (ORIGINAL PRINCIPAL LOST THROUGH NON-ECOURSE $ (Note 4) | LEND-ER'S NET CASH FLOWS $ | LOAN PRINCIPAL OUT-STANDING AT END OF PERIOD $ |
|---|---|---|---|---|---|---|---|---|
| 1/4/96 | 0 | 0 | -300,000 | 0 | 0 |  | -300,000 | 300,000 |
| 3/11/96 | 4,900 | 0 |  | 0 | 0 |  | 4,900 | 300,000 |
| 6/10/96 | 5,150 | 321 |  | -321 | 0 |  | 5,150 | 300,321 |
| 9/10/96 | 5,650 | 0 |  | 0 | 0 |  | 5,650 | 300,321 |
| 12/10/96 | 6,150 | 0 |  | 0 | 0 |  | 6,150 | 300,321 |
| 3/10/97 | 6,650 | 0 |  | 0 | 0 |  | 6,650 | 300,321 |
| 6/10/97 | 7,260 | 0 |  | 0 | 0 |  | 7,260 | 300,321 |
| 9/10/97 | 7,470 | 0 |  | 0 | 0 |  | 7,470 | 300,321 |
| 12/10/97 | 7,680 | 0 |  | 0 | 0 |  | 7,680 | 300,321 |
| 3/10/98 | 7,910 | 0 |  | 0 | 0 |  | 7,910 | 300,321 |
| 6/10/98 | 8,250 | 0 |  | 0 | 0 |  | 8,250 | 300,321 |
| 9/10/98 | 8,370 | 0 |  | 0 | 0 |  | 8,370 | 300,321 |
| 12/10/98 | 8,610 | 0 |  | 0 | 0 |  | 8,610 | 300,321 |
| 3/10/99 | 8,860 | 0 |  | 0 | 0 |  | 8,860 | 300,321 |
| 6/10/99 | 9,120 | 0 |  | 0 | 0 |  | 9,120 | 300,321 |
| 9/10/99 | 9,380 | 0 |  | 0 | 0 |  | 9,380 | 300,321 |
| 12/10/99 | 9,650 | 0 |  | 0 | 0 |  | 9,650 | 300,321 |
| 3/10/00 | 9,930 | 0 |  | 0 | 0 |  | 9,930 | 300,321 |
| 6/10/00 | 10,210 | 0 |  | 0 | 0 |  | 10,210 | 300,321 |
| 9/11/00 | 10,900 | 0 |  | 0 | 0 |  | 10,900 | 300,321 |
| 12/11/00 | 10,665 | 0 |  | 0 | 485 |  | 11,150 | 299,837 |
| 3/6/01 | 0 | 5,105 | 304,942 | -5,105 | 0 | 0 | 304,942 | 0 |

NOTE 1 - PAYMENTS IN THIS COLUMN EQUAL DIVIDEND RECEIPTS, LESS THE TRUSTEE FEE, UP TO, BUT NOT EXCEEDING, TOTAL INTEREST WHICH WOULD ACCRUE FOR THE PERIOD AT THE MAXIMUM INTEREST RATE.

NOTE 2 - ADDED LOANS ARE MADE BY THE LENDER AND RETURNED BY INVESTOR AS INTEREST - WITHOUT ACTUAL REMITTANCES - TO THE EXTENT THAT MINIMUM REQUIRED INTEREST IN A PERIOD EXCEEDS TRANSFERS BY THE TRUSTEE OUT OF DIVIDENDS.

NOTE 3 - SUCH PAYMENTS, IF ANY, EQUAL THE EXCESS OF DIVIDENDS RECEIVED BY TRUSTEE, LESS THE TRUSTEE FEE, OVER THE AMOUNT PAYABLE IN INTEREST DURING THE PERIOD.

NOTE 4 - A WRITEDOWN WOULD BE MADE ONLY IF, AND TO THE EXTENT THAT, THE VALUE OF THE COLLATERAL STOCK WERE LESS THAN THE VALUE OF THE LOAN PRINCIPAL AT THE END OF THE CONTRACT.

FIG. 12

FILE #: TOP024
VALUE DATE: 2/12/97
CASE: B    ORIGINAL PROJECTIONS OF VALUE FLOWS FOR "T-O-P" INVESTOR
(AS OF CONTRACT START)

| DATES | LOANS RE- CEIVED (RE- PAID) $ | TAX FUNDS USED $ | (INVEST- MENT IN COLLA- TERAL STOCK) $ | DIVI- DENDS RE- CEIVED $ | (TRUS- TEE FEE PAID) $ | (INTER- EST PAID) $ | TAX RE- DUCTION FROM EXCESS OF FEE + INTER- EST OVER DIV. $ | VALUE OF SHARES AT CON- TRACT END $ | (TAX IF SHARES SOLD AT CON- TRACT END $ | NET VALUE IF SHARES HELD $ | IF SHARES SOLD $ |
|---|---|---|---|---|---|---|---|---|---|---|---|
| 1/4/96 | 300000 | 43,199 | -660,000 | 0 | | | | | | -316,801 | -316,801 |
| 3/11/96 | 0 | | | 5700 | -350 | -5350 | 0 | | | 0 | 0 |
| 6/10/96 | 53 | | | 5768 | -350 | -5471 | 24 | | | 24 | 24 |
| 9/10/96 | 45 | | | 5838 | -350 | -5533 | 20 | | | 20 | 20 |
| 12/10/96 | 0 | | | 5908 | -350 | -5558 | 0 | | | 0 | 0 |
| 3/10/97 | 0 | | | 5979 | -350 | -5629 | 0 | | | 0 | 0 |
| 6/10/97 | 0 | | | 6050 | -350 | -5700 | 0 | | | 0 | 0 |
| 9/10/97 | 0 | | | 6123 | -350 | -5773 | 0 | | | 0 | 0 |
| 12/10/97 | 0 | | | 6196 | -350 | -5846 | 0 | | | 0 | 0 |
| 3/10/98 | 0 | | | 6271 | -350 | -5921 | 0 | | | 0 | 0 |
| 6/10/98 | 0 | | | 6346 | -350 | -5996 | 0 | | | 0 | 0 |
| 9/10/98 | 0 | | | 6422 | -350 | -6072 | 0 | | | 0 | 0 |
| 12/10/98 | 0 | | | 6499 | -350 | -6149 | 0 | | | 0 | 0 |
| 3/10/99 | 0 | | | 6577 | -350 | -6227 | 0 | | | 0 | 0 |
| 6/10/99 | 0 | | | 6656 | -350 | -6306 | 0 | | | 0 | 0 |
| 9/10/99 | 0 | | | 6736 | -350 | -6386 | 0 | | | 0 | 0 |
| 12/10/99 | 0 | | | 6817 | -350 | -6467 | 0 | | | 0 | 0 |
| 3/10/00 | 0 | | | 6899 | -350 | -6549 | 0 | | | 0 | 0 |
| 6/12/00 | 0 | | | 6981 | -350 | -6631 | 0 | | | 0 | 0 |
| 9/11/00 | 0 | | | 7065 | -350 | -6715 | 0 | | | 0 | 0 |
| 12/11/00 | 0 | | | 7150 | -350 | -6800 | 0 | | | 0 | 0 |
| 3/6/01 | -300098 | | | 0 | -350 | -5109 | 2457 | 1,000,000 | -151,999 | 696,899 | 544,900 |

(DO NOT ENTER DAT ON THIS PAGE. WHEN A NEW CASE IS PREPARED THIS PAGE WILL BE REVISED AUTOMATICALLY)

FIG. 13

FILE #: TOP024
VALUE DATE: 2/12/97
CASE: B    REVISED PROJECTIONS OF VALUE FLOWS FOR "T-O-P*" INVESTOR
           (AS OF VALUE DATE)

| DATES | LOANS RE-CEIVED (RE-PAID) $ | TAX FUNDS USED $ | (IN-VEST-MENT IN COLLA-TERAL STOCK) $ | DIVI-DENDS RE-CEI-VED $ | TRUS-TEE FEE PAID $ | (INTER-EST PAID) $ | TAX RE-DUC-TION FROM EXCESS OF FE + INTER-EST OVER DIV.+ WRITE DOWN $ | PRIN-CIPAL WRIT DOWN AT CON-TRAC END $ | VALUE OF SHARES AT CON-TRACT END $ | (TAX IF SHARES SOLD AT CON-TRACT End) $ | NET VALUE FLOWS IF SH. HELD $ | NET VALUE FLOWS IF SH. SOLD $ |
|---|---|---|---|---|---|---|---|---|---|---|---|---|
| 1/4/96 | 300,000 | 43,199 | -660000 | 0 | | 0 | | | | | -316801 | -316801 |
| 3/11/96 | 0 | | | 5,250 | -350 | -4,900 | 0 | | | | 0 | 0 |
| 6/10/96 | 321 | | | 5,500 | -350 | -5,471 | 145 | | | | 145 | 145 |
| 9/10/96 | 0 | | | 6,000 | -350 | -5,650 | 0 | | | | 0 | 0 |
| 12/10/96 | 0 | | | 6,500 | -350 | -6,150 | 0 | | | | 0 | 0 |
| 3/10/97 | 0 | | | 7,000 | -350 | -6,650 | 0 | | | | 0 | 0 |
| 6/10/97 | 0 | | | 7,610 | -350 | -7,260 | 0 | | | | 0 | 0 |
| 9/10/97 | 0 | | | 7,820 | -350 | -7,470 | 0 | | | | 0 | 0 |
| 12/10/97 | 0 | | | 8,030 | -350 | -7,680 | 0 | | | | 0 | 0 |
| 3/10/98 | 0 | | | 8,260 | -350 | -7,910 | 0 | | | | 0 | 0 |
| 6/10/98 | 0 | | | 8,600 | -350 | -8,250 | 0 | | | | 0 | 0 |
| 9/10/98 | 0 | | | 8,720 | -350 | -8,370 | 0 | | | | 0 | 0 |
| 12/10/98 | 0 | | | 8,960 | -350 | -8,610 | 0 | | | | 0 | 0 |
| 3/10/99 | 0 | | | 9,210 | -350 | -8,860 | 0 | | | | 0 | 0 |
| 6/10/99 | 0 | | | 9,470 | -350 | -9,120 | 0 | | | | 0 | 0 |
| 9/10/99 | 0 | | | 9,730 | -350 | -9,380 | 0 | | | | 0 | 0 |
| 12/10/99 | 0 | | | 10,000 | -350 | -9,650 | 0 | | | | 0 | 0 |
| 3/10/00 | 0 | | | 10,280 | -350 | -9,930 | 0 | | | | 0 | 0 |
| 6/12/00 | 0 | | | 10,560 | -350 | -10,210 | 0 | | | | 0 | 0 |
| 9/11/00 | 0 | | | 11,250 | -350 | -10,900 | 0 | | | | 0 | 0 |
| 12/11/00 | 0 | | | 11,500 | -350 | -10,665 | -218 | | | | 267 | 266 |
| 3/6/01 | -299,837 | | | 0 | -350 | -5,105 | 2,455 | 0 | 1020000 | -158399 | 717163 | 558764 |

(DO NOT ENTER DATA ON THIS PAGE. WHEN A NEW CASE IS PREPARED THIS PAGE WILL BE REVISED AUTOMATICALLY)

FIG. 14

FILE #: TOP024
VALUE DATE: 2/12/97
CASE: B

CALCULATIONS OF TERMINATION PAYMENT RECEIVED AND FUTURE CASH FLOWS FOREGONE BY LENDER IN CASE OF EARLY TERMINATION

| DATES | TERMINATION PAYMENTS RECEIVED IF TERMINATION REQUESTED BY LENDER $ | TERMINATION PAYMENTS RECEIVED IF TERMINATION REQUESTED BY INVESTOR $ | INTEREST NOT RECEIVED BY TRUSTEE TRANSFER OF DIVIDENDS RECEIVED $ | INTEREST NOT RECEIVED BY INVESTOR RETURN OF FUNDS FROM ADDED LOANS $ | NEW LOANS TO PAY INTEREST NOT MADE $ | LOAN REPAYMENT NOT RECEIVED) BY TRUSTEE PAYMENT OUT O DIVIDEND RECEIPTS END $ | LOAN REPAYMENT NOT RECEIVED) BY INVESTOR AT CONTRACT END $ | AVOIDED WRITE-DOWN OF ORIGINAL PRINCIPAL AT CONTRACT END $ | LENDER'S NET CASH FLOWS IF TERMINATION REQUESTED BY LENDER $ | LENDER'S NET CASH FLOWS IF TERMINATION REQUESTED BY INVESTOR $ | LOAN PRINCIPAL (OUTSTANDING) NOT OUTSTANDING AT END OF PERIOD $ |
|---|---|---|---|---|---|---|---|---|---|---|---|
| 1/0/00 | | | | | | | | | | | |
| 1/0/00 | | | | | | | | | | | |
| 1/0/00 | | | | | | | | | | | |
| 1/0/00 | | | | | | | | | | | |
| 1/0/00 | | | | | | | | | | | |
| 3/12/97 | 305263 | 292322 | | | | | | | 305263 | 292322 | 300321 |
| 6/10/97 | | | -6348 | 0 | 0 | 0 | 0 | 0 | -6348 | -6348 | -300321 |
| 9/10/97 | | | -6590 | 0 | 0 | 0 | 0 | 0 | -6590 | -6590 | -300321 |
| 12/10/97 | | | -6842 | 0 | 0 | 0 | 0 | 0 | -6842 | -6842 | -300321 |
| 3/10/98 | | | -7102 | 0 | 0 | 0 | 0 | 0 | -7102 | -7102 | -300321 |
| 6/10/98 | | | -7372 | 0 | 0 | 0 | 0 | 0 | -7372 | -7372 | -300321 |
| 9/10/98 | | | -7652 | 0 | 0 | 0 | 0 | 0 | -7652 | -7652 | -300321 |
| 12/10/98 | | | -7942 | 0 | 0 | 0 | 0 | 0 | -7942 | -7942 | -300321 |
| 3/10/99 | | | -8242 | 0 | 0 | 0 | 0 | 0 | -8242 | -8242 | -300321 |
| 6/10/99 | | | -8553 | 0 | 0 | 0 | 0 | 0 | -8553 | -8553 | -300321 |
| 9/10/99 | | | -8876 | 0 | 0 | 0 | 0 | 0 | -8876 | -8876 | -300321 |
| 12/10/99 | | | -9210 | 0 | 0 | 0 | 0 | 0 | -9210 | -9210 | -300321 |
| 3/10/00 | | | -9556 | 0 | 0 | 0 | 0 | 0 | -9556 | -9556 | -300321 |
| 6/10/00 | | | -9915 | 0 | 0 | 0 | 0 | 0 | -9915 | -9915 | -300321 |
| 9/11/00 | | | -10286 | 0 | 0 | 0 | 0 | 0 | -10286 | -10286 | -300321 |
| 12/11/00 | | | -10665 | 0 | 0 | -6 | 0 | 0 | -10672 | -10672 | -300327 |
| 3/6/01 | | | 0 | -5113 | 5113 | 0 | 305441 | 0 | -305441 | -305441 | 0 |

(DO NOT ENTER DATA ON THIS PAGE. WHEN A NEW CASE IS PREPARED THIS PAGE WILL BE REVISED AUTOMATICALLY)

FIG. 15

FILE #: TOP024
VALUE DATE: 2/12/97
CASE: B

VALUE FLOW PROJECTIONS FOR ALTERNATE ORDINARY INVESTMENT IN SHARES OF SAME CORPORATION

| DATE | NUMBER OF SHARES PURCHASED # | (VALUE OF SHARES PURCHASED) $ | TAX FUNDS USED $ | TOTAL DIVIDEND RECEIVED $ | (TAX) ON DIVIDENDS $ | VALUE OF SHARES AFTER 5+ YEARS $ | (TAX IF SHARES SOLD) $ | INVESTOR'S NET CASH FLOWS AFTER TAX IF SHARES HELD $ | IF SHARES SOLD $ |
|---|---|---|---|---|---|---|---|---|---|
| 1/4/96 | 5,455 | -360,000 | 43,199 | | | | | -316,801 | -316,801 |
| 3/11/96 | | | | 2,864 | -1,289 | | | 1,575 | 1,575 |
| 6/10/96 | | | | 3,000 | -1,350 | | | 1,650 | 1,650 |
| 9/10/96 | | | | 3,273 | -1,473 | | | 1,800 | 1,800 |
| 12/10/96 | | | | 3,545 | -1,595 | | | 1,950 | 1,950 |
| 3/10/97 | | | | 3,818 | -1,718 | | | 2,100 | 2,100 |
| 6/10/97 | | | | 4,151 | -1,868 | | | 2,283 | 2,283 |
| 9/10/97 | | | | 4,265 | -1,919 | | | 2,346 | 2,346 |
| 12/10/97 | | | | 4,380 | -1,971 | | | 2,409 | 2,409 |
| 3/10/98 | | | | 4,505 | -2,027 | | | 2,478 | 2,478 |
| 6/10/98 | | | | 4,691 | -2,111 | | | 2,580 | 2,580 |
| 9/10/98 | | | | 4,756 | -2,140 | | | 2,616 | 2,616 |
| 12/10/98 | | | | 4,887 | -2,199 | | | 2,688 | 2,688 |
| 3/10/99 | | | | 5,024 | -2,261 | | | 2,763 | 2,763 |
| 6/10/99 | | | | 5,165 | -2,324 | | | 2,841 | 2,841 |
| 9/10/99 | | | | 5,307 | -2,388 | | | 2,919 | 2,919 |
| 12/10/99 | | | | 5,455 | -2,455 | | | 3,000 | 3,000 |
| 3/10/00 | | | | 5,607 | -2,523 | | | 3,084 | 3,084 |
| 6/12/00 | | | | 5,760 | -2,592 | | | 3,168 | 3,168 |
| 9/11/00 | | | | 6,136 | -2,761 | | | 3,375 | 3,375 |
| 12/11/00 | | | | 6,273 | -2,823 | | | 3,450 | 3,450 |
| 3/6/01 | | | | | | 556,364 | -76,660 | 556,364 | 479,704 |

(DO NOT ENTER DATA ON THIS PAGE. WHEN A NEW CASE IS PREPARED THIS PAGE WILL BE REVISED AUTOMATICALLY)

FIG. 16

DATA PROCESSING SYSTEM FOR ANALYZING AND ADMINISTERING A STOCK INVESTMENT LIMITED-RECOURSE BORROWING CONTRACT

BACKGROUND OF THE INVENTION

Individual U.S. investors who do not want additional current income are naturally attracted to investments which seem likely to provide a large proportion of their reward in the form of capital appreciation rather than in current dividends. A similar attraction exists for many foreign investors who are subject to high home-country tax rates on current income but are taxed at lower rates, or not at all, on capital gains. One indication of this attraction has been the growth in the sale of the shares of investment companies which concentrate their investments in the shares of small start-up companies which, even if successful, are not likely to begin paying dividends for some time. Another indication has been the growth in the sale of insurance company deferred annuity contracts. The investments in the start-up companies have a high risk, however, and the investments effectively made through annuity contracts involve sizeable administrative expense, the ultimate taxation of all capital gains as income, and, in many cases, the required purchase of unwanted insurance coverage. Accordingly, many investors prefer to place a substantial proportion of their investments in the shares of larger U.S. companies with well-established track records. Unfortunately for such investors, these companies typically feel that they must pay out a substantial proportion of their earnings in current dividends in order to attract the investments of those who do wish current income or are tax-exempt. Some investors attempt to offset this unwanted dividend income with interest expense resulting from purchasing shares on margin, but this approach also involves high risk since the investor faces the possibility, if the investment falls drastically in value, not only of losing his entire investment but also of still having to repay the borrowing, while receiving no value in return for that additional outlay. Moreover, the investor who purchases stock on margin faces the risk that the loan will be called just at the time the stock's value is at a possibly temporary low point. Investors who do not wish current income but want to avoid the high risks of start-up companies and margin loans or the cost and tax burdens and undesired life insurance coverage of deferred annuity contracts have heretofore had no way of investing in the stocks of major corporations without earning unwanted current dividend income and having to pay current taxes on that income.

SUMMARY OF THE INVENTION

The present inventor has developed a practical way for an investor to invest without high risk in the equity of established companies with the expectation that most, if not all, of the net return on the investment will be in the form of capital gains rather than in the form of current income. The investment is made through a contract between an investor, a lender, and a trustee. By agreement with the other party either the lender or the investor could serve as the trustee. In accordance with the contract, at the time the contract is signed the lender lends to the investor on an interest-bearing but limited-recourse basis, for a period not exceeding ten years, a negotiated sum equal to a substantial proportion, not exceeding half, of the market value of a specified number of shares of a specified company. Under the terms of the contract, the lender also agrees to lend specified additional amounts to the investor on a full-recourse basis for the payment of interest under certain circumstances described below. At the time that the contract is signed, the investor places the shares in the hands of the trustee as collateral for repayment of obligations to the lender at maturity of the contract. The lender is promised periodic interest payments of at least a stated minimum percentage each period plus additional interest equal to any excess, up to a stated maximum interest percentage, of dividend payments during that period over the minimum interest obligation. The minimum percentage is set at a level which is reasonably expected to determine the actual interest payment during the early portion of the contract life. The initial loan amount is set in the contract at a level which provides a loan on which the expected cost to the investor and the expected yield to the lender are judged by the investor and by the lender to be commercially appropriate, given current market conditions, dividend expectations, the collateral provided, and the minimum and maximum interest percentages. The interest obligation is a full faith and credit obligation of the investor but is paid to the extent possible by the trustee on behalf of the investor from the dividends received by the trustee on the collateral stock. During the course of the contract, in any period in which dividend payments fall short of the minimum interest obligation, the additional interest is considered to be paid by the investor from the proceeds of an additional loan from the lender. Interest payment provisions on any additional loan are identical to those on the initial loan. In any period in which the dividend payments exceed the maximum interest obligation, the excess is paid by the trustee to the lender as reduction of loan principal outstanding, the reduction being applied first to any outstanding principal resulting from loans to pay interest. At the end of the contract period any outstanding interest obligation and any loan principal obligation outstanding as a result of loans to pay interest is a full faith and credit obligation of the investor, but the investor's obligation to pay any remaining principal of the original loan is limited recourse in that he is not obligated to repay any amount of that principal in excess of the value of the stock collateral at that time. At the end of the contract period the trustee is obligated to return the collateral stock to the investor only after the investor has fulfilled his payment obligations to the lender. To the extent the investor fails to meet those obligations the trustee will meet those obligations to the extent possible by transfer of stock to the lender and will then return the remaining shares, if any, to the investor.

Dividends are considered income of the investor, and interest payments are considered expense of the investor. The terms of the contract make it unlikely that the investor will receive substantial dividends in excess of his interest obligations. Either the investor or the lender may sell or transfer its rights and obligations in a contract with the agreement of the other party. To provide emergency liquidity to the investor and to the lender on their investments, in case either needed to cash in his investment and either could not obtain the permission of the other party or could not find a buyer on reasonable terms, the contract specifies conditions under which either party may, probably without damage to the other party, require early termination of the contract, repayment of principal, payment of appropriate interest, and return of collateral.

The contracts are often referred to hereinafter by their proprietary name, "T-O-P$^{SM}$" contracts. Without adverse regulatory or tax consequences, the "T-O-P$^{SM}$" contract achieves the desirable objective of effectively permitting one participant, the investor, to invest in the equity of a U.S. corporation which has a reasonably predictable dividend pattern with the expectation, though not the certainty, of receiving back at the end of the contract period value equal to his investment plus the full appreciation over the contract period of the stock purchased both with his own funds and with the borrowed funds, while permitting the other participant, the lender, to make a loan with the expectation, though not the certainty, of receiving back the principal of the loan at the end of the contract plus interest payments during the life of the contract equal to the dividends on the total amount of stock involved but not less than a specified minimum percentage nor more than a specified maximum percentage per period. If the investor chooses not to remit the principal repayment to the lender at maturity of the contract, the trustee will repay the principal to the extent possible by transferring to the lender an amount of the collateral shares having a market value equal to the unpaid loan principal. The remaining shares, if any, are transferred to the investor, at which point the investor's obligations with respect to the principal come to an end. In most cases the lender will probably be an institution, the investment return of which is either tax-exempt or taxed on a deferred basis at the same high rate for both income and capital gains.

The data processing system, in accordance with the present invention, enables "T-O-P$^{SM}$" contract participants to analyze and administer the contracts prior to or at their inception and at any time thereafter. The system is composed of a data processor (computer), a memory device for receiving and storing input data for retrieval and use by the computer, and output devices, ordinarily a display screen for immediate viewing of the output data by the user, and a printer and an electronic transmitter for viewing of the output data by the user or generating hard copies of the output data for the user and others. The system receives and stores input data and provides output data under the management of a program loaded into a computer.

In particular, the system includes, first, a programmed data processor and a storage device for receiving and storing the following input data on a selected value date when the system is used prospectively or retrospectively to analyze and administer the contract:

(i) contract data, including an identification of the investor, the lender, the trustee, the contract dates, the amount of the loan, the name and amount of the collateral stock, the minimum and maximum interest rates, the trustee fee, and the excess over a Treasury note interest rate which the lender would be forecast to forego if the contract were terminated early in various circumstances;

(ii) information on the investor's tax basis in the stock put up as collateral and forecast tax rates applicable to him during the life of the contract;

(iii) actual data on the market price of the stock and on dividends paid on the stock during a period of years prior to the contract and during the period, if any, between the start of the contract and the value date for which an analysis is being prepared; and (iv) estimated data including estimates of share market prices and dividends on selected dates from the contract start and from value date to the end of the contract.

The system further includes a programmed processor and output devices for processing the input data and producing output readable by the user and by others including:

(i) projections of the average annual rates of return on investment for the investor and for the lender over the life of the contract determined by discounting the projected value flows resulting from the estimated share prices and dividends and projected interest payments and principal payments;

(ii) estimates of the value flows which would accrue to the investor if, instead of investing in a "T-O-P$^{SM}$" contract, he invested the same amount of his own funds for the same period in the same stock without benefit of a "T-O-P$^{SM}$" contract;

(iii) for use in termination decisions, estimates of future market prices and dividends on dates subsequent to the dates having the latest available actual data prepared by extrapolating the growth rates exhibited by the actual data over a specified prior period; and (iv) projections of the value flows to be experienced by the investor and by the lender over the life of a contract both if the contract is allowed to run its full term and if the contract is terminated early and for the investor both if the shares are sold at the end of the contract and, alternatively, if the shares continue to be held by the investor.

There are essentially nine variables which govern the rates of return to the investor and to the lender in a "T-O-P$^{SM}$" contract; they are:

1) the ratio of the loan to the initial value of the collateral shares;

2) the ratio of the initial value of the collateral to the investor's tax basis in the shares;

3) the initial level and rate of increase in the stock price;

4) the initial level and the rate of increase in the dividend payments;

5) the interest rate minimum percentage;

6) the interest rate maximum percentage;

7) the Treasury note interest rate;

8) the size of the interest rate penalties for early contract termination; and 9) the tax rates.

If any one of the variables is changed, the potential value of the contract to the investor, to the lender, or to both may change, and a change in any variable may affect the position of a party during negotiation of a contract and may change his actions during the life of a contract. The data processing system of the present invention enables both the investor and the lender, prior to entering into a contract and at any time during its life, to determine their prospective rates of investment return. The processing system provides results virtually instantaneously and is indispensable to the negotiations setting the size of the loan and its set of interest terms. By updating stock prices, dividend payments, and Treasury note interest rates with actual data during the course of the contract, thereby triggering appropriate changes in projections, both the investor and the lender may determine what future payments are likely to be required and whether it is, or is not, likely to be advantageous to exercise the right of early termination for which the contract provides.

Over the life of the contract the proportion of the input based on actual data increases and the proportion based on projected and calculated data decreases.

For a better understanding of the invention reference may be made to the following description of an exemplary embodiment taken in conjunction with the accompanying drawings.

DESCRIPTION OF THE DRAWINGS

FIG. 7 is an example of the "T-O-P$^{SM}$" computer program Page Choice Menu.

FIG. 8 is an example of the "T-O-P$^{SM}$" Summary Output page.

FIG. 9 is an example of the "T-O-P$^{SM}$" Contract Terms and Basic Assumptions page.

FIG. 10 is an example of the "T-O-P$^{SM}$" Dividend, Share Price, and Interest Rate Market Data And Projections page.

FIG. 11 is an example of the Original Projections of Lender's Cash Flows and Loans Outstanding page.

FIG. 12 is an example of the Revised Projections of Lender's Cash Flows and Loans Outstanding page.

FIG. 13 is an example of the original Projections of Value Flows for "T-O-P$^{SM}$" Investor page.

FIG. 14 is an example of the Revised Projections of Value Flows for "T-O-P$^{SM}$" Investor page.

FIG. 15 is an example of the Calculations of Termination Payment Received and Future Cash Flows Foregone by Lender in case of Early Termination page.

FIG. 16 is an example of the Value Flow Projections for Alternate Ordinary Investment in Shares of Same Corporation.

DESCRIPTION OF THE EMBODIMENT

Figure 1:
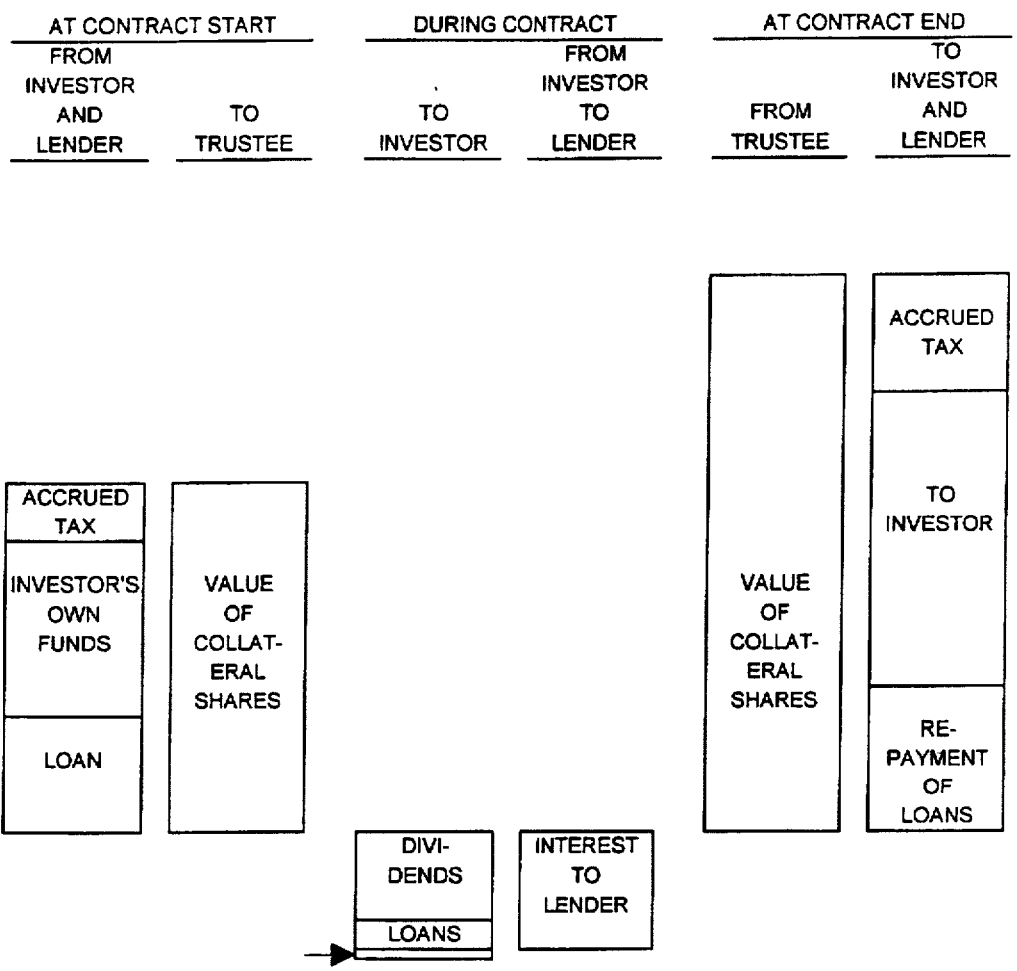
FIG. 1 is a block diagram representation of the net value flows arising from a "T-O-P$^{SM}$" contract if the price of the stock involved and the dividends thereon increase moderately over the life of the contract but dividends in some periods are below accrued interest.

FIG. 1 presents graphically what the value flows would be for both the investor and the lender, as parties to a "T-O-P$^{SM}$" contract which was allowed to run its full course, if the share price and dividends on the stock involved increased moderately over the life of the contract but dividends during some periods of the contract were below the amounts of interest accrued during those periods. The value of the stock placed in the hands of the trustee is shown by the second block from the left. That value comes from three sources, as shown by the left block. The lower shaded portion represents that portion of the shares financed by the loan provided by the contract. That financing could have been used either to buy new shares on the market or to provide to the investor funds replacing those which he would have received from a sale of those shares in the market if he had not decided to hold a continued investment in those shares. The middle portion of the left block represents that portion of the collateral shares provided by the investor from his own after-tax assets either by buying new shares or by placing in the hands of the trustee shares which the investor would have sold if he had not decided to hold a continuing investment in those shares. And the top portion of the left block represents shares equivalent to the value which the investor would have had to transfer to the government in tax if the shares already held by the investor had been sold rather than kept as an investment. That upper portion does not really represent an investment by the investor since he would not have received that value had he not invested by continuing to own those shares. That upper block would not exist, however, if all the shares put up as collateral were newly purchased shares or shares held by the investor with a tax basis equal to the market price of the shares at the start of the contract.

The middle portion of FIG. 1 covers the payments to the investor and to the lender during the course of the contract. The total amount of the interest payments by the investor to the lender is represented by the shaded rectangle in the fourth column. In this case the largest part of those payments are made by transfers by the trustee on behalf of the investor of all the dividends received on the collateral stock, as shown in the bottom rectangle of the third column. But in this case the dividends fell short of the minimum payment in some of the quarters. As a result the investor had to make some additional payments of interest to the lender in those quarters equal in total over the life of the contract to the small rectangle just below the dividends in the third column. No actual cash remittance is made, however. Each additional payment is considered to be made by the investor by returning to the lender the proceeds of an additional loan from the lender. The small rectangle at the bottom of the third column represents the payments which the investor will effectively recover as a result of the tax deductibility of the excess of the total interest payments over the total of dividend receipts.

The next-to-the-last column represents the assumed market value to which the collateral shares have increased by the end of the contract. If the investor wishes to receive back from the trustee all of the collateral shares, and wishes to keep holding all of them, he must at the end of the contract period remit directly to the trustee funds equal to the required loan principal repayment, as shown in the shaded rectangle at the bottom of the last column. In effect he will be making an investment at that time in addition to that which he made at the start of the contract. The choice of that course could appeal to the investor, for in that case he would receive at that time, in addition to shares equal in value to his new investment and his original investment, shares equal to the appreciation of all the collateral shares over the contract period, and he would not be liable for any tax on the gain at that time. If he sold the shares at some later time, he probably would be subject to tax at that later time, but if he held the shares and they passed to his heirs by testamentary transfer, the gain in the value of the shares over the contract period would probably never be taxed. Alternatively, if the investor, or the investor and the trustee, sold all the shares at the end of the contract period, the investor would be liable at that time for the tax represented by the upper rectangle of the last column. In that event the investor's original investment of his own funds would have grown only to the value represented by the middle rectangle of the last column.

Figure 2:
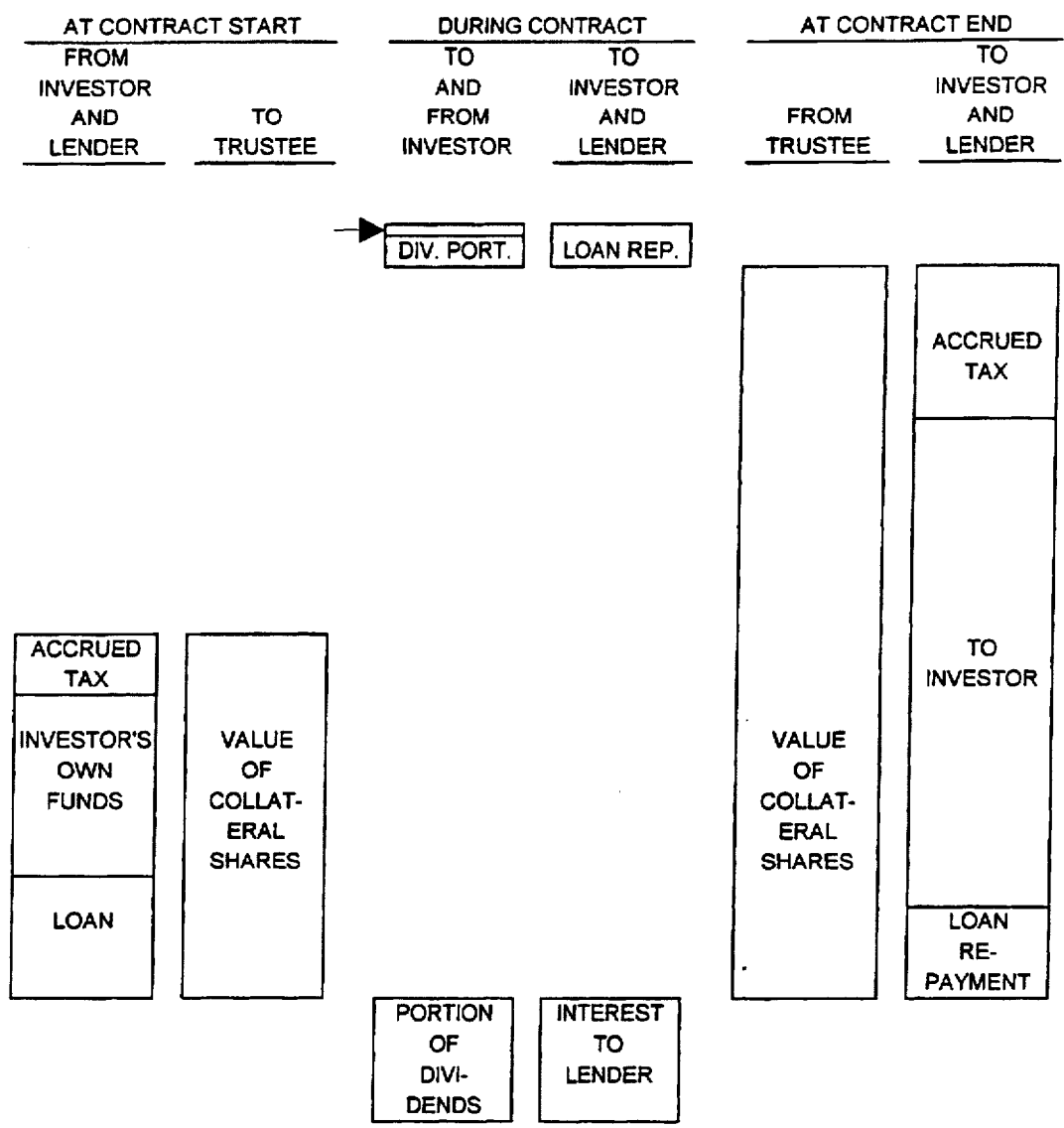
FIG. 2 is a representation of the net value flows if the stock price and dividends increase greatly and dividends in some periods exceed maximum interest.

FIG. 2 illustrates the results of a "T-O-P$^{SM}$" contract if the stock price and dividends increase greatly over the contract period and dividends in some periods exceed the maximum required interest payment. In this case it was assumed that the dividend increase was so rapid that all interest payments were covered by dividends passed on by the trustee to the lender. It was also assumed that the dividends increased to the extent that they exceeded the maximum level of interest payment. As a result a portion of the dividends were remitted by the trustee to the lender as repayment of principal, as represented by the small rectangle at the top of the fourth column. In this case the amount of the loan repayment on behalf of the investor was equal to the excess of the total dividend receipts over the portion of the dividends paid in interest, but for the investor a portion of those dividend receipts was effectively offset by the tax payable by him on the excess of the total dividends over the total interest as represented by the small rectangle at the top of the third column.

Figure 3:
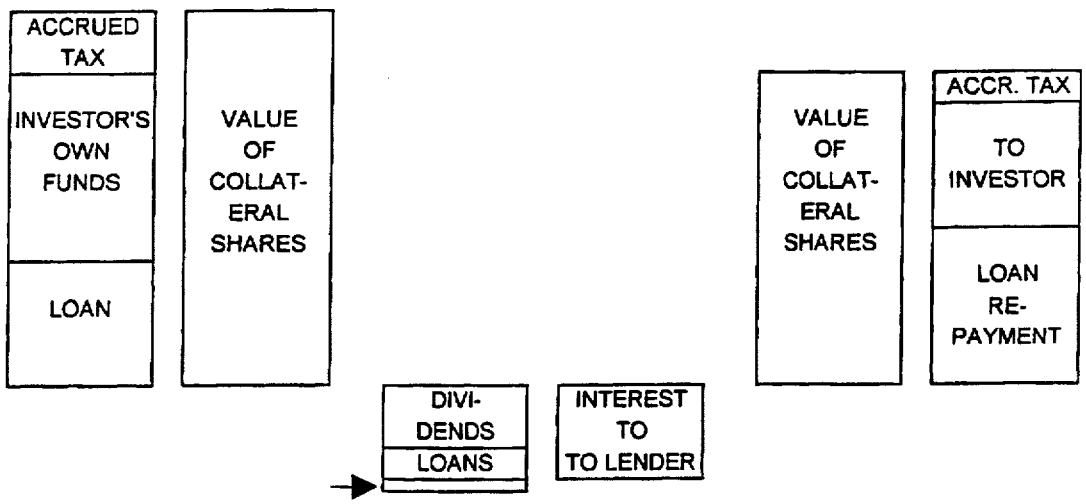
FIG. 3 is a representation of the net value flows if the stock price and dividends decrease moderately and dividends in some periods are below accrued interest.

FIG. 3 illustrates the results if the stock price and dividends decrease moderately over the life of the contract and dividends in some periods are below accrued interest. As shown in the middle columns, in this case the investor has to make some interest payments by returning the proceeds of additional loans from the lender. At the end of the contract in this case the investor receives back less than his original investment. The lender, on the other hand, receives full repayment of the loan principal.

Figure 4:
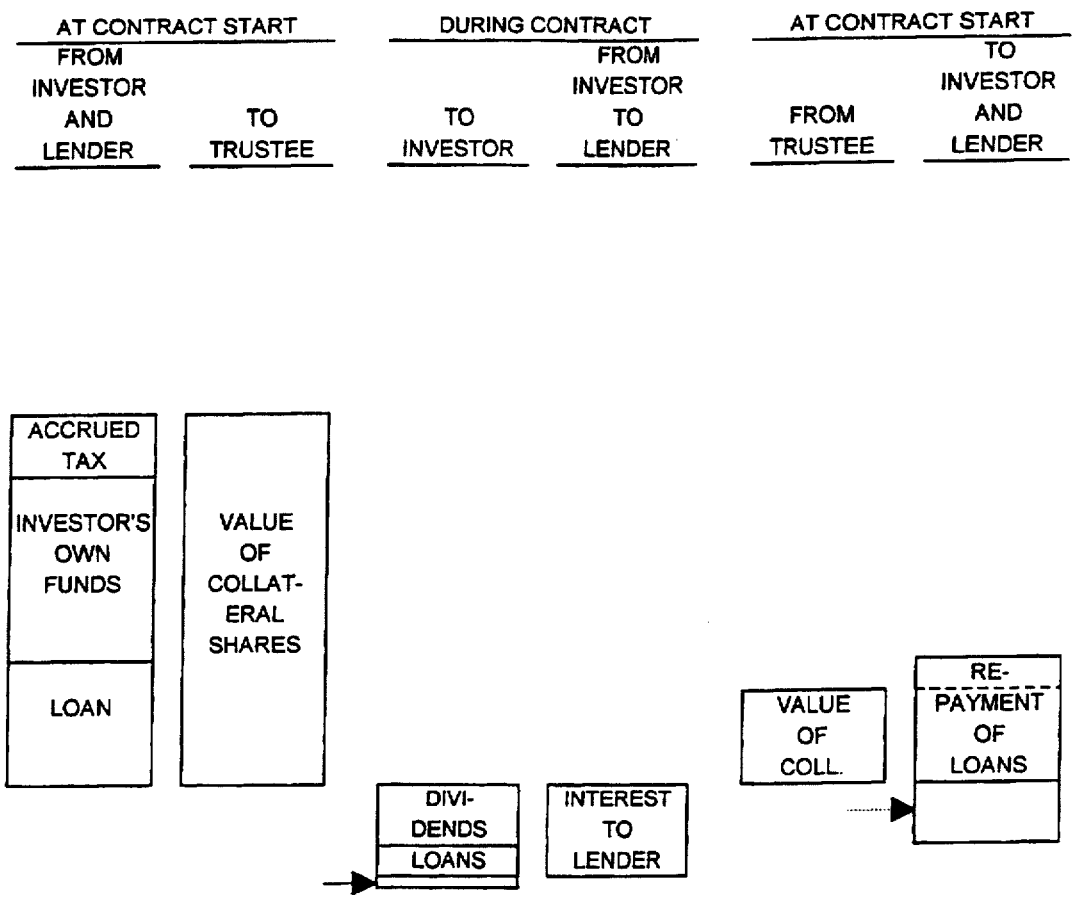
FIG. 4 is a representation of the net value flows if the stock price and dividends decrease greatly and dividends in some periods are below accrued interest.

FIGS. 4 illustrates the results if the stock price and dividends decrease greatly over the life of the contract and dividends in some periods are below accrued interest. The lender still receives his full entitlement to minimum interest payments and to repayment of loans to pay interest but receives back less than full repayment of loan principal since the value of the collateral at the end of the contract period is less than the amount of principal outstanding at that time on the original loan. The investor in this case loses his entire investment but is not required to make up the shortfall in principal to the lender. The portion of the right-hand column above the dashed line represents the repayment of the loans to pay interest by some form of direct remittance by the investor to the lender.

Figure 5:
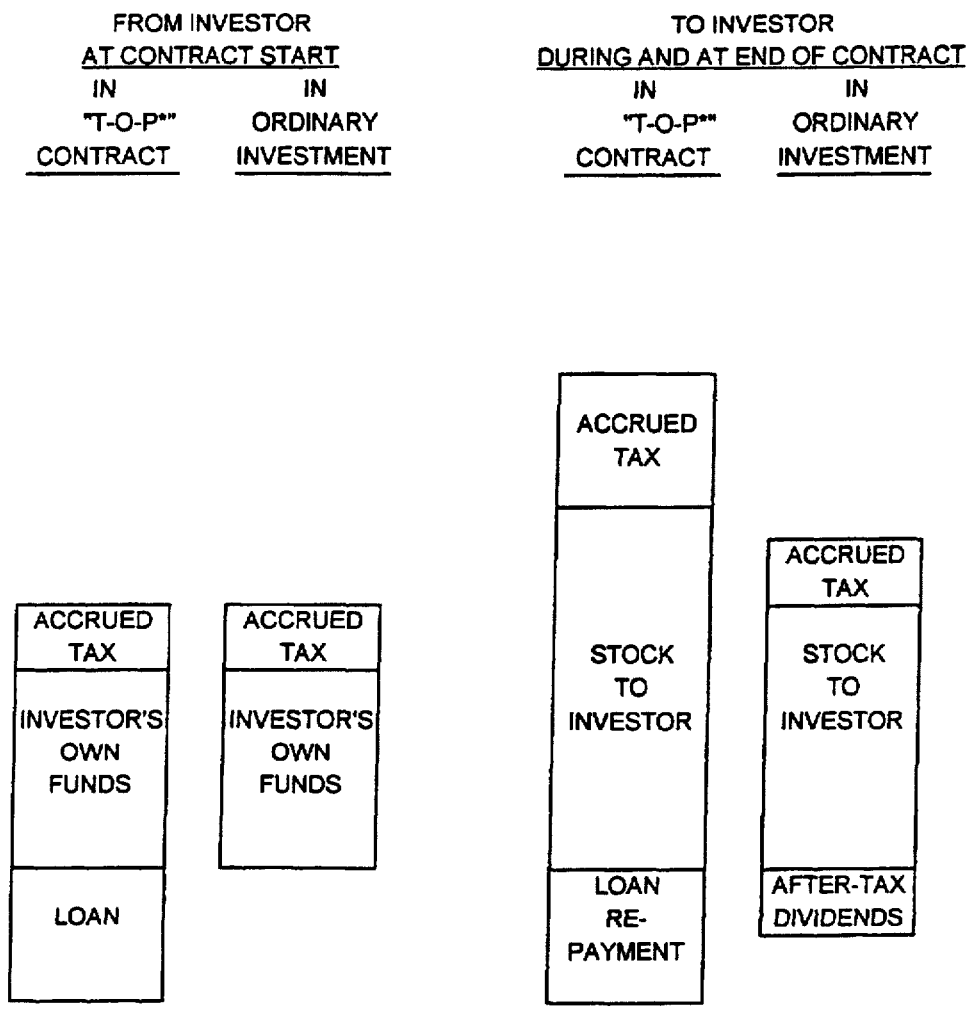
FIG. 5 is a representation of the net value flows for the investor from an investment in a "T-O-P$^{SM}$" contract and, alternatively, from an investment of the same amount of the investor's own funds as an ordinary share investment in the same stock for the same period if the stock price and dividends increase moderately.

FIG. 5 provides a comparison of the results for the investor if the stock price and dividends increase moderately over the contract period, and dividends are above the interest minimum and below the interest maximum during all contract periods, and the investor invests through a "T-O-P$^{SM}$" contract or, alternatively, through an ordinary purchase of the same stock with the same outlay of his own after-tax funds. As can be seen in the last column, the investor receives dividends, which are taxed, only on the alternative ordinary stock investment, but on the "T-O-P$^{SM}$" contract investment he receives larger, and possibly untaxed, capital gains.

The results of cases such as those illustrated by the first five figures above are set forth numerically in the computer-generated pages contained in the figures described below, which illustrate the computer program by which a "T-O-P$^{SM}$" contract is analyzed and administered. The program performs the complex calculations required to apply past experience and assumptions about the future to the negotiation of a "T-O-P$^{SM}$" contract and to administration of such a contract during its life, especially to determine whether it would be advantageous for either party to the contract to make use of the contractual provisions permitting a demand for accelerated termination of the contract. The operation of the computing system is illustrated with the numbers from an assumed specific contract.

Figure 6:
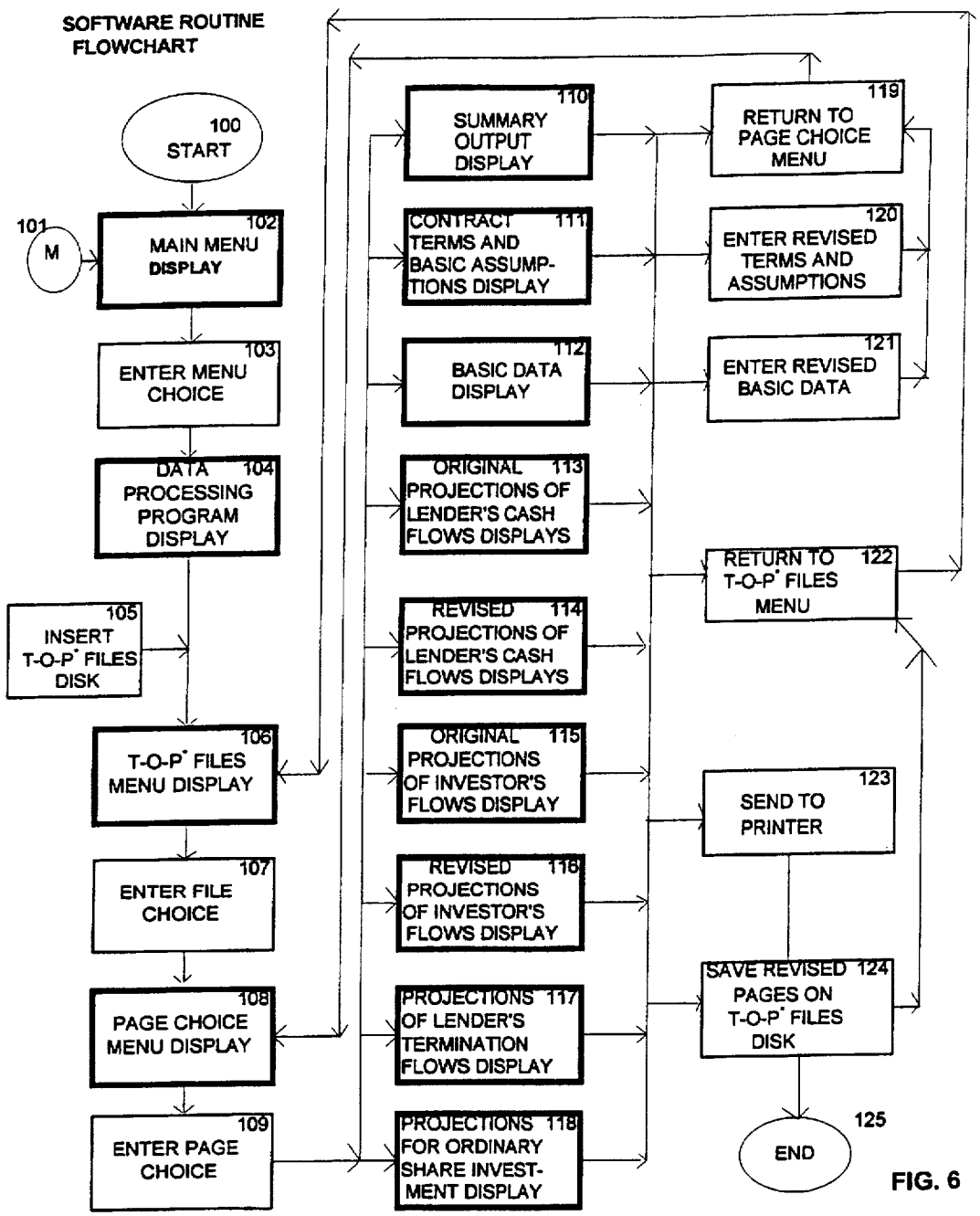
FIG. 6 is a flowchart of the software routine for the entry of data and assumptions and for the analysis required for the negotiation and administration of a "T-O-P$^{SM}$" contract.

FIG. 6 is a flowchart depicting the main menu routine for software to be used in the data processing system according to the preferred embodiment of the present invention. The system starts at block 100, where a computer, such as a personal computer or a mainframe with workstations, is activated in a manner to display its main menu on a display screen, as represented by block 102. This block and all other blocks which represent displays are shown by rectangles with heavily lined borders. Entry point M, as shown in block 102, is provided to allow other routines to return to the main menu routine. The system next proceeds to block 103, where the user enters the choice from the main menu of a data processing program, such for example as Microsoft Excel, which is displayed in block 104.

The user then at block 105 inserts into the computer a "T-O-P$^{SM}$" disk, which contains at least one file with a standard data and analysis blank form, in which no data or assumptions have yet been inserted, and may also contain a number of files each of which had been created earlier by the filling-in of the standard blank form to record the commitments, data, and relationships among the data for a specific contract and set of assumptions. The menu of these files is displayed in block 106.

Next in block 107 the user enters his choice of a blank file or a file on a particular contract to work on. Each file has a number and, associated with it, a value date, which indicates the date for which that file was prepared, and a case designation, e.g. A, B, or C, to distinguish separate cases prepared for the same value date. Each page of a file displays in the upper left corner the file number, the value date, and the case designation. When a file is chosen, the first page of that file is automatically displayed at block 108, as illustrated in FIG. 7, to provide a menu of the pages from which the user can choose the page on which he wishes to work with regard to that contract. He then enters his choice at block 109 by instructing the computer to go to the address listed on the menu for his choice of page. The menu provides addresses for two data entry display pages, 3, and 4, and for seven output display pages, 2, 5, 6, 7, 8, 9, and 10. If he wishes to enter initial or new information he has to choose among the two data pages, 3 and 4, shown in the shaded blocks 111, and 112, illustrated by FIGS. 9 and 10, depending on which type of data he wishes to enter.

If he wishes, for example, to consider the effects of a change in one or more of the terms of an existing contract or other basic assumptions, he chooses to go to the Contract Terms and Basic Assumptions page, block 111, illustrated by data entry page 3, FIG. 9, where the previously contemplated basic terms of the contract and other assumptions necessary for predicting the results of the contract at expiration are displayed. The display includes:

identification of the participants in the contract;

the contract dates;

the amount of the initial loan under the contract;

the type and number of shares put up as collateral;

the minimum and maximum interest rate percentages payable in each period (for convenience the percentages are listed as annual percentages; those percentages are actually 365 times the actual daily interest rate percentages used by the "T-O-P$^{SM}$" computer program in all its calculations);

the fee paid the trustee;

the excess over the percentage yield on a specified U.S. Treasury Note which the lender would be estimated to forego if the contract were terminated early by action of the investor or, alternatively, by action of the lender;

the investor's tax basis in the shares put up as collateral; and the forecast effective income and capital gains tax rates applicable to the investor over the course of the contract.

If after studying the existing terms and assumptions he wishes to change one or more of them, he enters the revision or revisions in block 120, and their effects are instantaneously and automatically reflected on all other appropriate pages of the file. The processing rules for data entered on an input page of a "T-O-P$^{SM}$" file are embedded in the files before any data is entered. There is a different rule for each type of data. When, for example, new or revised data on the names of the stock, the buyer, and the seller are entered in block 120 on to the block 118 Basic Assumptions page, FIG. 9, that data is simply automatically copied to the appropriate cells of the Summary Output, page 1, in block 110, FIG. 8. When in block 120 the number of shares bought is changed the new number is automatically copied into the appropriate location on the Summary Output page, and at the same time multiplied by the data on that page for share prices and dividends per share to create the data on that page for total share values and total dividend payments. When future tax rate assumptions are entered in block 120, they are both entered on the block 111 Basic Assumptions page, FIG. 9, and applied to the before-tax cash flows on block 115, 116, and 118, FIGS. 13, 14, and 16, to create the after-tax cash flow columns on those pages.

If he has no other revisions in basic assumptions to make, the user then instructs the computer at block 119 to return "home", that is return to the page choice menu at block 108. At that point he may like to see in summary form the effects of the revisions he has made. This he can achieve in block 109 by choosing the Summary Output display in block 110. FIG. 8 provides an example of what would be displayed on the Summary Output page for a particular case. None of the data on this page are entered directly on this display. Each piece of information is either a repetition of data entered on a data input page or information generated by the "T-O-P$^{SM}$" disk program using the information on the data input pages. By studying the summary page the user can be reminded or informed of:

the value of the collateral being held under the contract at the start of the contract and on the value date for which the summary information was prepared;

the amount of the investor's investment of his own after-tax funds in the contract and the after-tax rates of return on that investment over the life of the contract as projected at the contract start and on the value date, with the returns being given both for the eventuality that he continued to hold all the collateral shares after the end of the contract period and for the eventuality that he sold all the shares at the end of the contract period;

the amount of the principal outstanding as a loan under the contract at the start of the contract and at the value date and the yields on that loan as projected at the contract start and on the value date;

the fee being paid to the trustee;

the contract dates;

the annual average growth rates of dividends and prices on the collateral stock for a period prior to the contract start and as projected at the contract start and at the value date for the period of the contract;

the market value of the shares per share and in total at the contract start, at the value date, and at the contract end as projected at the contract start and at the value date;

the dividend on the collateral shares per share and in total on the occasions of the last payment prior to the contract start, on the most recent payment prior to the value date, on the next projected payment date as projected on the value date, and on the projected last payment date prior to the contract end as projected both at the contract start and at the value date;

a projection as of the value date of the amount of the next interest payment and of the extent to which it will be paid out of dividend receipts and of the extent, if any, to which it will be paid by a new loan from the lender to the investor;

a projection as of the value date of the extents to which the next projected dividend will be used for paying the trustee fee, paying interest, and repaying some portion of the outstanding indebtedness;

a projection as of the value date of the after-tax returns which the investor would have received if, instead of investing in the "T-O-P$^{SM}$" contract, he had invested the same amount of his own after-tax funds in the collateral stock for the same period of time without benefit of the limited recourse loan made available by the contract; and the projected future interest yields under the contract which would be foregone by the lender if the contract were terminated early by the investor or, alternatively, by the lender.

If after studying the Summary output page the user is satisfied with the results, he can then, if he wishes, obtain a hard copy of, or dispatch by communication lines, any or all of the file by entering instructions in block 123. He could then in block 106 save the revised file on the "T-O-P$^{SM}$" disk either as a revision of the existing file, using the same file number, value date, and case designation, or as a new file with a new number, value date, and case designation. The user can then either choose another file to consider in block 106 or exit the data processing program through block 104.

If after studying the revised Summary output display at block 110 the user wishes, before printing, transmitting or saving the revised file, to make further revisions, he can at block 122 return to the page choice menu at block 108 and then choose at block 109 to return to the Basic Assumptions display at block 111, or he can choose block 112, if he wishes to revise some of the Market Data employed in protecting the effects of the contract.

If he wishes, for example, to enter new information regarding a recent dividend on the Market Data page on block 112, data input page 4, FIG. 10, the user chooses to go to that page, where actual data on share prices and dividends at the start of the contract, at the value date and in a number of other past quarters are displayed along with estimated data for each remaining quarter of the contract period. The data on this page for quarter-end share prices are the generally conveniently available data for the prices of the last stock exchange trades in those quarters. For all uses in the contract, however, when it is allowed to run its full course, the share prices for the day of the contract start, the value date, and the day of the contract end are from the closing trades on the most recent previous trading dates. When in block 112 he enters new actual data, he replaces previously estimated entries on that page, and the effects of that new data are automatically taken into account in revisions of all projections. By such entries the proportion of forecast data in the analysis is gradually reduced over the life of the contract. On the FIG. 10 example page, the actual data for periods prior to the value date are shown in bold print. The forecast data are shown on three different bases: within the boxes as estimated by the participants at the contract start and as estimated on the value date by the preparer of the revised case, and outside the boxes as automatically projected by extrapolation from actual data for calculations used in early termination analysis. This last set of projections for use in termination decisions is not left to the possibly self-interested discretion of the preparer but is created by assuming that the data subsequent to the value date fall along a continuation of a constant quarterly rate of growth curve calculated by the computer program as the best fit, on a least squares basis, to the actual data for a recent period, in this case twelve quarters.

To allow for the possibility of stock splits the Market Data page also includes, for each dividend and share price date, a listing of the number of shares which were, or are projected to be, equivalent to the number of shares placed in the hands of the Trustee at the start of the contract. And for use in termination calculations that page also lists one other piece of market data as of the value date, that is the yield as of the market closing on the previous trading day on the U. S. Treasury Note maturing closest to but after the end of the contract period.

After completing his entry of revisions of input data the user can return to the display of Summary Output in block 110, or he can choose to have displayed the detailed cash flow projections behind the Summary by choosing block 113, FIG. 11, to see the detailed flows for the lender as projected at the contract start, block 114, FIG. 12, to see the detailed flows for the lender as projected at the value date, block 115, FIG. 13, to see the detailed flows for the investor as projected at the contract start, block 116, FIG. 14, to see the detailed flows for the investor as projected at the value date, in all cases assuming the contract were allowed to run its full course. He can choose block 117, FIG. 15, to see the projected cash flows for the lender if contract termination is accelerated. Alternatively, he can choose block 118, FIG. 16, to see a display of what the projected flows for the investor would have been from investing the same amount in the same stock for the same period by the ordinary share investment method.

If, for example, he chooses to go to block 116, FIG. 14, the user will see the detailed value flows projected for the investor as of the value date. These flows are referred to as value flows rather than cash flows since, if the investor chooses at the end of the contract not to sell the shares what he will receive at that time will be value in the form of shares rather than in the form of cash. In the case illustrated the investor borrowed initially $300,000, that is 45.45% of the $660,000 current value of the collateral at the time the contract was signed. Subsequently on Jun. 10, 1996 the dividend paid on that date was not sufficient, after payment of the trustee fee, to pay interest accrued at the minimum interest rate on the principal outstanding since the previous interest payment on Mar. 11, 1996, and the investor had to borrow an additional amount of $321, which was used to bring the total interest payment up to the minimum. In all the subsequent periods the actual or projected dividend payments were, or are expected to be, large enough to cover the required interest payments. And in the last period of the contract the dividend payment is projected to be large enough to provide some funds for repayment of indebtedness after payment of interest at the maximum interest rate. At the end of the contract period in this case the collateral value is projected to exceed the loan principal outstanding, so there will be no possible effect of the non-recourse feature of the contract.

On the basis of actual data and projections as of the value date as shown on the example display in FIG. 14, the computer program calculates that the investor would receive returns on his investment of his own funds over the contract period of 15.81% if he continued to hold the shares after the contract period and 10.99% if he sold all the shares. The higher return is that which he would ultimately have earned if the shares remain in his possession until his death in view of the fact that under current federal, and most state, laws appreciation in the value of a decedent's assets from the date of acquisition to the date of death are not subject to capital gains tax. These internal rates of return, both of which are displayed on the Summary page, FIG. 8, are derived from the columns of investor net value flows in FIG. 14 by calculations which use computer iteration to determine the daily discount rate which makes the sum of the discounted values of future flows, when discounted daily back to the date of the initial investment, equal in total to the sign-reversed value of the initial investment. Specifically, if the initial investment at time 0 is represented by Fo, the next flow one quarter later by F1, the next flow by F2, etc., then the daily discount rate D expressed as a percentage is determined by the formula $$-F_0 = \Sigma \left( \frac{F_1}{1+D} + \frac{F_2}{(1+D)^2} \cdots \frac{F_{1825}}{(1+D)^{1825}} \right)$$

for a five-year (1825-day) contract period. The annual earnings rate is 365 times the calculated daily discount rate D.

If the user chooses to go to block 114, FIG. 12, he will see the detailed cash flows projected for the lender as of the value date. These cash flows are used to calculate projected percentage yields for the lender in a manner corresponding to that used for the investor. In the case illustrated, there would be no difference between the rates of return before and after tax since the lender is assumed to be tax-exempt. As shown on the Summary page, in this example the lender is projected as of the value date to earn over the life of the contract a yield of 10.44%.

If block 118, FIG. 16, is chosen, the user will see the results of automatic calculations of what would have been the cash flows from an alternative investment in the same stock on the same day for the same period as for a "T-O-P$^{SM}$" contract if the investment had been made in the ordinary way in which a stock is purchased by a single one-time payment with no borrowing or deferred or contingent rights or obligations. Such projections play an important role in facilitating negotiations of "T-O-P$^{SM}$" contracts, particularly with respect to the proportion of the share price to be borrowed at the time of contract signing by the investor. On the basis of actual and estimated share prices as of the value date, the computer program calculates that on the alternate investment the investor would have earned a return of 13.2% if he continued to hold the shares after the five years and a return of 10.51% if he sold all the shares after the five years. These returns are displayed on the Summary page.

If a choice is made to go to the output display of Projections of Lender's Cash Flows in Case of Termination in block 117, FIG. 15, the user will see projected cash flows related to the remainder of the contract period only. If a decision is made to terminate the contract early, the investor is obligated under the contract to make payments twenty-eight days after announcement of the termination decision for repayment of principal and for a final interest payment. In most cases the principal repayment would be for the full amount of debt principal outstanding. In the special case, however, that the full value of all the collateral shares on the announcement date were less than the principal amount outstanding from the initial borrowing, and the investor either allowed the trustee to turn the shares over to the Lender or made a payment to the Lender equivalent to the value of the collateral shares, then the Lender would have no further recourse to the Investor or his shares, and the Investor would have no further obligation to the Lender, with respect to the principal of the original loan. The amount of the final interest payment would depend upon which party to the contract opted for the early termination. The provisions of the contract are such that if the investor calls for prepayment, then the final interest payment would be sufficiently large that the lender could probably lay out the total of the interest and principal payments received in a new loan and receive future cash flows arising from that loan in an amount greater than the borrower would have received if the contract had not been terminated.

To achieve this result, the future cash flows which would be expected for the lender if the contract remained in force are discounted back to the termination payment date by an interest rate which is set above the U.S. Treasury note interest rate for a comparable maturity by only a small percentage specified in the contract. That interest rate would be expected to be below that which the lender could expect to achieve on a new loan of a comparable riskiness to that involved in the contract. The final interest payment would be the discounted sum of the future payments under the contract less the principal payment. This calculation procedure provides emergency liquidity to the investor but in a manner unlikely to prove harmful to the lender. In the reverse situation, i.e., when the lender calls for early termination, the projected future cash flows under the contract are discounted at an interest rate a larger percentage above the Treasury note rate. As a result it would be expected that the investor could borrow in a new loan the amounts to be paid on the termination payment date and obligate himself under the new loan contract for future payments smaller than those called for under the "T-O-P$^{SM}$" contract. As a result the investor would not be expected to be harmed by any decision of the lender to call for early termination. In practice the termination provisions will probably be called into play only rarely, since the participants in a "T-O-P$^{SM}$" contract would be expected to be long-term investors and lenders, and even when a participant in a contract found it necessary to cash in his interest in a contract he would probably find it preferable, rather than using the contract termination provisions, to seek permission to sell his interest to a third party. Under the contract either party would have to have the permission of the other party to transfer its interest to a third party other than in a testamentary transfer. This provision is necessary because of the existence of some credit risk for the lender on payment of interest and because each party would normally prefer that the other party be a long term investor not likely to call for early termination of the contract. It would not be expected that either party would object to a transfer to another long-term investor of equal or higher credit standing.

The future interest payments displayed in FIG. 15 for early termination calculations would not be based on projections chosen by the investor or the lender. Rather those projections are prepared by the computer program by extrapolating forward for the remainder of the contract the experience of the twelve quarters preceding the termination announcement date. The share value used in the calculations for the termination date would be that of the last trading date preceding the termination announcement date. And the share value used in the calculations for the end of the contract period would be that extrapolated by the computer program from the twelve quarters preceding the termination decision.

After review by the user any one or all of the more detailed cash flow projections can be turned into hard copy or communicated to others by entries in block 123.

This software routine can be carried out as often as desired. It can be used in advance of contract signing to reveal the effects of possible terms being considered in negotiations. It can be used after contract signing to reveal the effects of possible contract revisions or changes in external circumstances. It can be used by either party to a contract to determine whether it would appear to be in his interest to require accelerated termination of the contract. Without the routine the contracts would not be commercially viable since the effects of a contract and of changes in it would be so extremely difficult to judge that few investors would consider entering into such a contract.

I claim:

1. A data processing system for analyzing and administering before and upon its inception and at any time thereafter a stock investment limited recourse borrowing contract under which an investor borrows on a limited recourse basis from a lender a substantial proportion not exceeding one half the value of the shares of a specified corporation placed as collateral in the hands of a trustee on the basis of an undertaking by the investor to pay to the lender an amount of interest varying, within the range of a minimum percentage and a maximum percentage, with the amount of dividends paid on the collateral stock, with the investor's obligation to pay interest being unconditional but with the obligation to repay the original borrowing being limited to the value of the collateral stock at the end of the contract period, comprising programmed data processing and storage means for receiving and storing the following input data on a current date when the system is used prospectively or retrospectively to analyze the contract on a date of analysis:
(1) contract data including the identity and amount of the collateral stock, the amount of the initial loan and the minimum and maximum interest rate percentages;
(2) actual data relating to the stock including its market price per share at the end of each of a selected number of quarters preceding the date of the analysis and on the trading date preceding the contract start and the dividend per share, if, any, paid in each of a selected number of quarters preceding the date of analysis;
(3) and estimated data relating to the stock including its estimated market price per share at the end of each quarter during the remaining life of the contract after the date of analysis and at the contract end and the estimated dividend per share, if any, to be paid during each of the remaining quarters of the contract;

means for processing the input data and producing the following output data therefrom:
(1) the calculations of average growth rates of market prices per share and dividends per share both for a period prior to the contract start and for the term of the contract by determining constant growth rate curves which minimize the sum of the squares of the deviations of the actual and projected market prices per share and dividends per share from the corresponding data points on the curves;
(2) projections of the amounts of interest to be paid by the investor in each period of the contract and of the amounts and timing of principal repayments to be made by the investor to the lender; and
(3) projections of the average internal rates of return to both the investor and the lender over the life of the contract on their investments under the contract by discounting over the contract term all of the inflows and outflows of value to the investor and to the lender based on actual and projected market prices per share and dividends per share and means for producing a report that includes the following information:
(1) the identities of the investor, lender and trustee;
(2) the identity, amount and value of the collateral;
(3) the amount of the loan;
(4) the contract dates; and
(5) the output data.

2. A data processing system according to claim 1 wherein the means for processing the input data further produces as output data projections of future market prices per share and dividends per share by extrapolating growth rates in the actual market prices per share and the actual dividends per share for a selected period prior to the analysis date.

3. A data processing system according to claim 1 wherein the means for processing the input data further produces as output data projections of the amounts of interest and principal which the investor would have to pay to the lender on the termination date if the investor or, alternatively, the lender chose to exercise a right contained in the contract to terminate the contract early and projecting the future rates of return foregone by the lender in the event of such early termination.

4. A data processing system according to claim 3 wherein the input data further include the yield on a U.S. Treasury Note maturing after the date of analysis and selected percentage amounts of excesses over the yield of the estimated future annual interest rate foregone by the lender if the contract is terminated early by the investor or the lender.

5. A data processing system according to claim 1 wherein the mean for processing the input data further produces as output data projections of the internal rates of return which would have been earned by the investor if he had invested the same amount of his own after-tax funds in the same stock for the same period without benefit of the contract.

6. A data processing system according to claim 1 wherein the input data include tax rate and tax basis data for the investor and the means for processing the input data further produces as output data projections of the average internal rates of return to the investor after taxes.

7. A data processing system according to claim 1 wherein the input data are periodically updated during the term of the contract to include actual market prices per share of the stock and actual dividend payments per share so that over the life of the contract in the calculation of internal rates of return the significance of forecast data declines and the significance of actual data increases.

8. A data processing system for analyzing and administering before and upon its inception and at any time thereafter a stock investment limited recourse borrowing contract under which an investor borrows on a limited recourse basis from a lender a substantial proportion not exceeding one half the value of the shares of a specified corporation placed as collateral in the hands of a trustee on the basis of an undertaking by the investor to pay to the lender an amount of interest varing, within the range of a minimum and a maximum percentage, with the amount of dividends paid on the collateral stock, with the investor's obligation to pay interest being unconditional but with the obligation to repay the original borrowing being limited to the value of the collateral stock at the end of the contract period, comprising
programmed data processing and storage means for receiving and storing the following input data on a current date when the system is used prospectively or retrospectively to analyze the contract:
(1) contract data including the identity and amount of the collateral stock and the amount of the initial loan and the minimum and maximum interest rate percentages;
(2) actual data relating to the stock including its market price per share at the end of each of a selected number of quarters preceding the current date and on the trading date next preceding the contract start and the dividend per share, if any, paid during each of a selected number of quarters preceding the current date;
(3) and estimated data relating to the stock including its estimated market price per share at the end of each quarter during the remaining life of the contract and at the contract end and the dividend per share, if any, to be paid during each the remaining quarters of the contract;
means for processing the input data and producing the following output data therefrom:
(1) calculations of average growth rates of stock prices per share and dividends per share both for a period prior to the contract start and for the term of the contract by determining constant growth rate curves which minimize the sum of the squares of the deviations of the actual and projected data from corresponding data points on the curves;
(2) projections of future stock prices per share and dividends per share determined by extrapolating growth rates per share calculated for the actual data of selected past period;
(3) projections of the amount of interest to be paid by the investor in each period of the contract and of the amounts and timing of principal repayments to be made by the investor;
(4) projections of the average internal rates of return of both investor and the lender over the life of the contract on their investments under the contract determined by discounting over the contract term all of the inflows and outflows of value to the investor and to the lender based on actual and projected stock prices and dividends;
(5) projections of the amounts of interest and principal which the investor would have to pay to the lender on the termination date if the investor or, alternatively, the lender chose to exercise the right contained in the contract to terminate the contract early and projections of the future rates of return foregone by the lender in the event of such early termination; and
(6) projections of the internal rates of return which would have been earned by the investor if he had invested the same amount of his own after-tax funds in the same stock for the same period without benefit of the contract
and means for producing report that includes the following information:
(1) the identities of the investor, lender and trustee;
(2) the identity, amount and value of the collateral;
(3) the amount of the loan;
(4) the contract dates; and
(5) the output data.

9. A data processing system according to claim 8 wherein the input data include tax rate and tax basis data for the investor and the means for processing the input data further produces as output data projections of the average internal rates of return to the investor after taxes.

10. A data processing system according to claim 8 wherein the input data are periodically updated during the term of the contract to include actual market prices per share of the stock and actual dividend payments per share so that over the life of the contract in the calculations of internal rates of return the significance of forecast data declines and the significance of actual data increases.

* * * * *